United States Patent
Klassen et al.

(10) Patent No.: US 6,985,249 B2
(45) Date of Patent: Jan. 10, 2006

(54) VARIABLE DATA PRINTING WITH OPTIMIZED CACHE

(75) Inventors: R. Victor Klassen, Webster, NY (US); Norman W. Zeck, Webster, NY (US)

(73) Assignee: Xerox Corporation, Stamford, CT (US)

( * ) Notice: Subject to any disclaimer, the term of this patent is extended or adjusted under 35 U.S.C. 154(b) by 911 days.

(21) Appl. No.: 09/888,755

(22) Filed: Jun. 25, 2001

(65) Prior Publication Data

US 2002/0196468 A1  Dec. 26, 2002

(51) Int. Cl.
*G06F 15/00* (2006.01)

(52) U.S. Cl. .................. 358/1.18; 358/1.16; 358/1.17; 358/1.15; 358/296; 707/101

(58) Field of Classification Search ...... 358/1.17–1.18, 358/1.15–1.16, 1.1, 296, 404, 505, 518; 707/101; 710/56, 52, 1

See application file for complete search history.

(56) References Cited

U.S. PATENT DOCUMENTS 5,737,503 A * 4/1998 Mitani ...................... 358/1.16
6,049,390 A   4/2000 Notredame et al. ........ 358/1.15

OTHER PUBLICATIONS

"Optimal Prepaging and Font Caching" by David R. Fuchs and Donald E. Knuth, ACM Transactions on Programming Languages and Systems, vol. 7, No. 1, Jan. 1985, pp. 62-79.

* cited by examiner

*Primary Examiner*—Twyler Lamb
(74) *Attorney, Agent, or Firm*—Fay, Sharpe, Fagan, Minnich & McKee, LLP

(57) ABSTRACT

A method for processing raw application data, which includes a plurality of occurrences of an object, receives a stream of the raw application data into a job inspector. The raw application data includes object raw data, which represents the object, and other raw data. The stream of the raw application data is scanned within the job inspector for identifying each of the occurrences of the object. The object raw data is transmitted to a cache manager. Data representing the object raw data is cached as a function of the object occurrences detected by the job inspector.

21 Claims, 5 Drawing Sheets

VARIABLE DATA PRINTING WITH OPTIMIZED CACHE

BACKGROUND OF THE INVENTION

The present invention relates to digital image printing. It finds particular application in conjunction with improving productivity in production printing of variable data documents and will be described with particular reference thereto. It will be appreciated, however, that the invention is also amenable to other like applications.

In a variable data printing application, every printed document may be unique. However, some elements are typically common to more than one (1) of the pages. An example of a variable data application is a PowerPoint presentation, which includes at least one (1) complex graphic that appears on more than one (1) of the slides (pages). The variable data for each of the respective slides in the presentation may include, for example, the slide number and the non-repeating content (e.g., a complex graphic that only appears on one (1) of the slides). Elements that are repeated within the presentation (e.g., "master" content) may include a corporate logo and/or other background information common to all of the slides. Caching the repeated elements (i.e., the "master" content) offers efficiency within a printing system, especially if the master content includes complex graphics or scanned images (which are relatively more expensive to construct during a raster image process ("RIP") or at final assembly time).

A conventional printing apparatus receives input data describing elements within a visual image on, for example, a page. The elements are rasterized according to a RIP for creating a printed output. If the page includes multiple graphical elements, the amount of data that must be rasterized tends to be very large. Therefore, a memory device (e.g., a cache) within a printing device is allocated as an intermediate buffer for temporarily memorizing received input data.

In most current RIP systems, a bottleneck is encountered when rendering (processing) and, in particular, scaling and/or rotating, images. Color correction may also play a significant role in slowing down the processing of images. The time for rasterizing pages including simple text and graphics is dominated by fonts and/or complex graphics not already in the cache. A font is unique if the combination of the font name, style, and transformation is unique. An image is unique if the combination of the file location (assuming file contents remain fixed), scale, and rotation portions of the transformation are unique. A piece of complex graphics is uniquely identified by a corresponding sequence of PostScript instructions (except when the set of instructions contains conditions that cannot be resolved in early binding). Unless explicitly identified, complex graphics that repeatedly occur are uncommon and hard to recognize.

Standard cache management strategies (e.g., Least Recently Used (LRU)) are based on heuristic means of predicting, on average, which cache objects are least likely to be needed or, alternatively, if they are needed, which cache objects will be needed last. The need for heuristics is based on the fact that a computer program's resource needs (typically its needs for specific pages of memory) for applications unlike the present variable data printing application cannot be predicted without essentially executing a program. Some small amount of look-ahead may be performed, especially in straight-line code. However, in practice, very little information about future requests is available. Importantly, a significant amount of information about future requests is available in variable data applications. However, conventional cache management strategies are not capable of benefiting from this look-ahead data.

Conventionally, caches used within variable data systems rely on heuristics (probability of future need) or user supplied information for deciding whether to cache information. No conventional cache implements a system in which information that is constant (repeated) throughout the presentation (e.g., a corporate logo and other slide background information) is identified and pre-rasterized so that it is rasterized in advance of its first use. Therefore, conventional cache managers do not pre-fetch resources (e.g., fonts, transformed images, etc.) into the cache or have a good mechanism for determining what resources to pre-fetch. Consequently, the time for processing pages requiring new resources is not optimized. Also, the efficiency and throughput for a corresponding printing system is reduced.

Furthermore, although the concept of a cache has been used for speeding up serial processing of document data, parallel processing has not been used utilized by cache managers within a variable data system.

The present invention provides a new and improved apparatus and method which overcomes the above-referenced problems and others.

SUMMARY OF THE INVENTION

A method for processing raw application data, which includes a plurality of occurrences of an object, receives a stream of the raw application data into a job inspector. The raw application data includes object raw data, which represents the object, and other raw data. The stream of the raw application data is scanned within the job inspector for identifying each of the occurrences of the object. The object raw data is transmitted to a cache manager. Data representing the object raw data is cached as a function of the object occurrences detected by the job inspector.

In accordance with another aspect of the invention, the object raw data is converted into object raster data. Each of the occurrences of the object raw data in the raw application data is replaced with an identifier associated with the object raster data. The raw application data is converted into raster data. The identifiers within the raw application data are replaced with the object raster data.

In accordance with a more limited aspect of the invention, the transmitting and caching steps include identifying a location within the cache corresponding to the object raster data according to a hashing function.

In accordance with a more limited aspect of the invention, the caching step further includes transmitting both the object raster data and the object raw data into the cache, if a size of the object raster data is greater than a size of the object raw data.

In accordance with another aspect of the invention, the steps of receiving, scanning, transmitting, and caching are performed in parallel.

In accordance with another aspect of the invention, the caching step includes a) converting the object raw data into object raster data and b) transmitting the object raster data into a cache.

In accordance with another aspect of the invention, the caching step includes identifying objects used in the most distant future.

In accordance with another aspect of the invention, the caching step includes determining a frequency of usage of the object.

In accordance with another aspect of the invention, the caching step includes evaluating a processing cost of the object.

In accordance with another aspect of the invention, the caching step includes at least two of identifying objects used in the most distant future, determining a frequency of usage of the object, and evaluating a processing cost of the object.

One advantage of the present invention is that it increases the efficiency of a printing system including constant data.

Another advantage of the present invention is that it introduces opportunity for parallel processing of document data.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
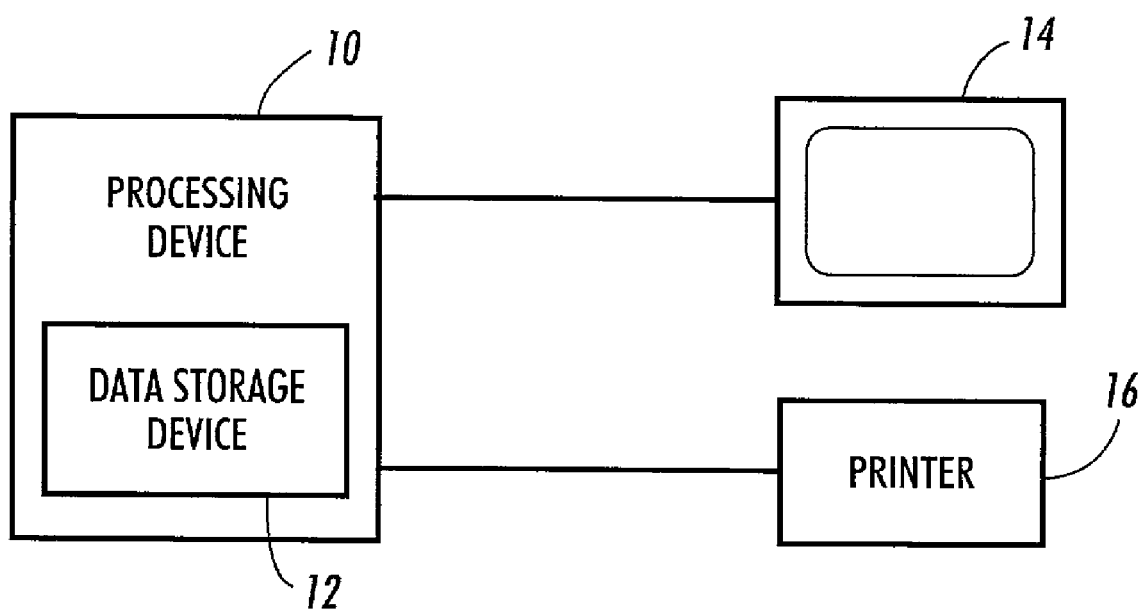
FIG. 1 illustrates a system according to the present invention.

With reference to FIG. 1, a processing device 10 includes a data storage device 12 (e.g., a computer disk storage device), which stores raw application data for a digital image. By "raw application data" is meant data in any of many forms, such as print description languages (PDLs) or in the form naturally stored by the application program creating the data. In the preferred embodiment, the image includes both variable and master data. As discussed above, the variable data represents, for example, a slide number and non-repeating content (e.g., a complex graphic that only appears once) within a PowerPoint presentation. Conversely, the master data represents elements (objects) (e.g., complex graphics such as a corporation's logo) that are common to more than one (1) of the pages in the image.

A first output device 14 (e.g., a monitor), which communicates with the processing device 10, produces a representation of the image that may be viewed by an operator. A second output device 16 (e.g., a printer output device), which also communicates with the processing device 10, produces a "hard-copy" of the image on an output medium (e.g., paper).

Figure 2:
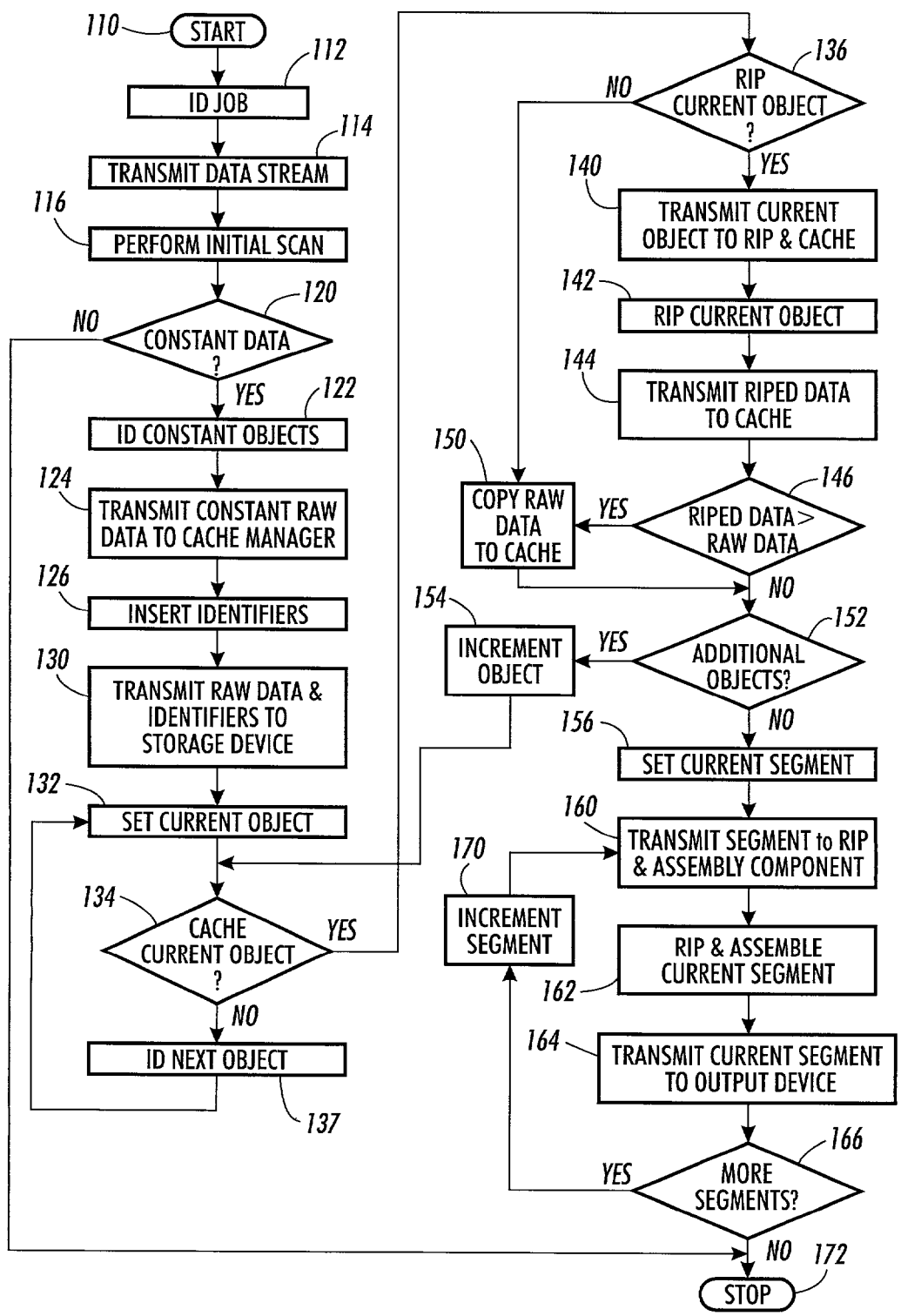
FIG. 2 illustrates a flowchart for the method of printing variable and constant data according to the present invention.
Figure 3:
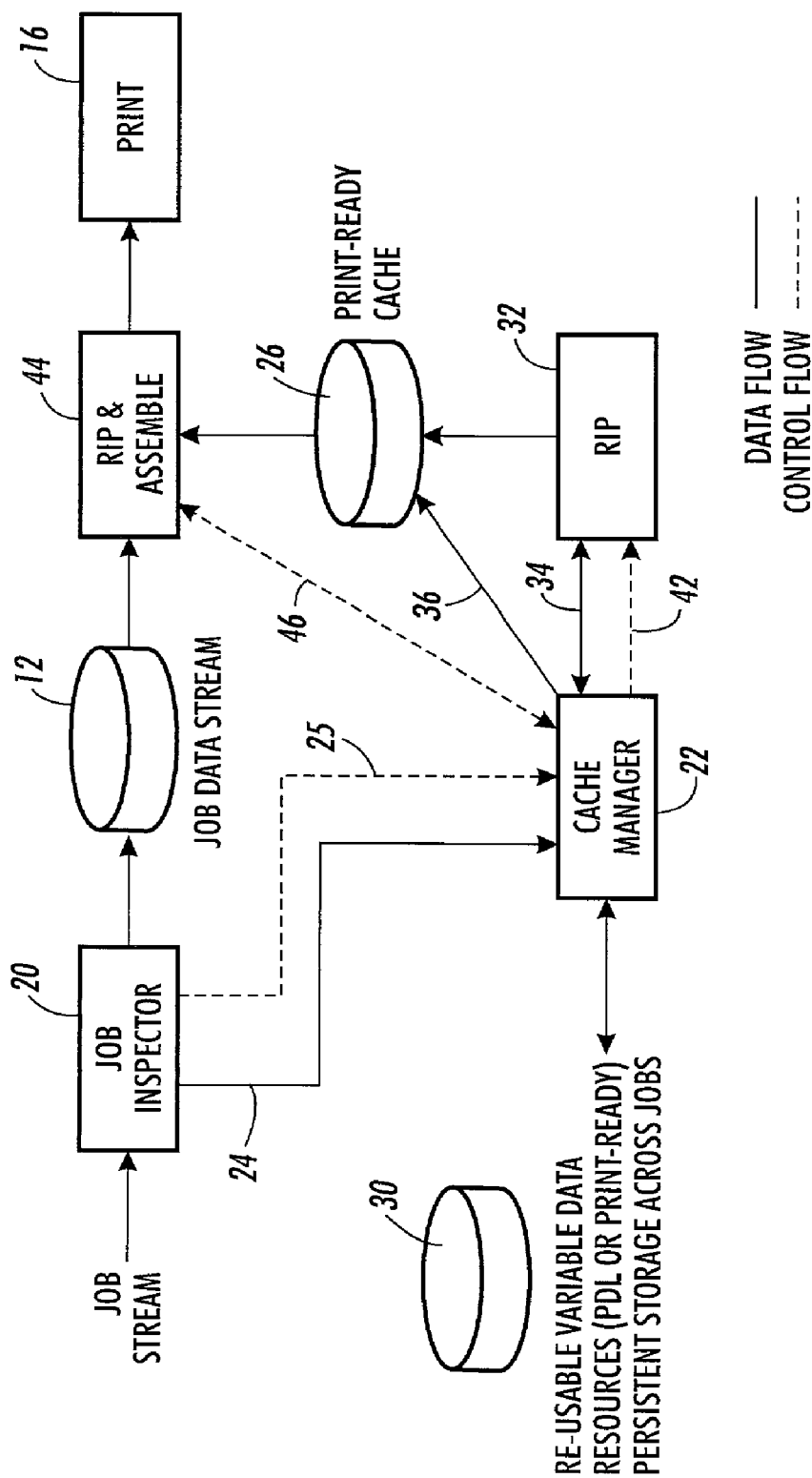
FIG. 3 illustrates a flow of data within the system of the present invention.
Figure 4:
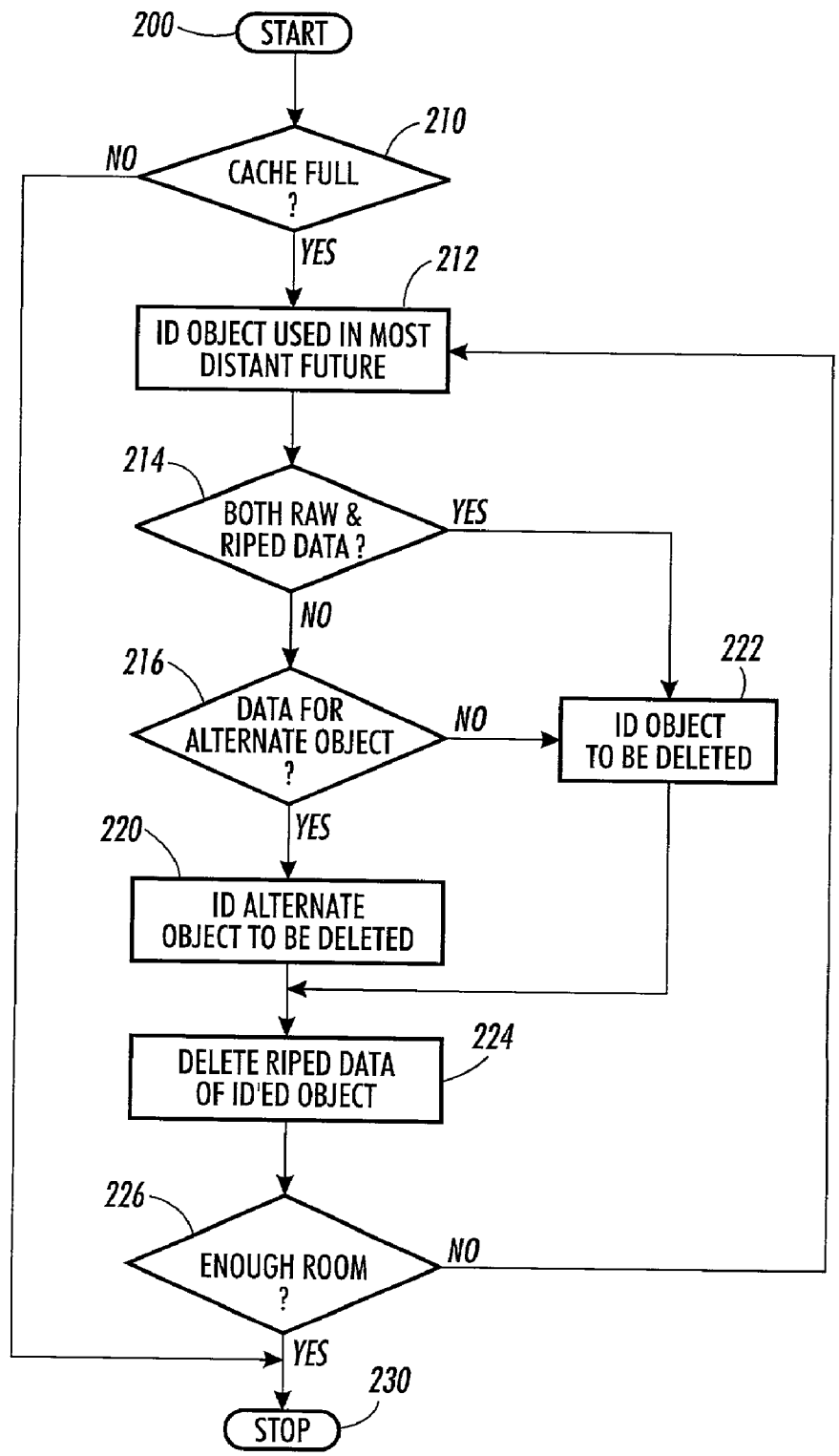
FIG. 4 illustrates a flowchart of the caching strategy for the present invention.

With reference to FIGS. 1–3, a method for processing raw application data begins in a step 110. A job is identified in a step 112. The identification process includes specifying the raw application data, which is associated with the digital image (job) to be rasterized, within the data storage device 12. "Processing" is meant to include any set of processing steps that transforms raw application data into a representation that is ready to view or print on an output device or medium. Examples of processing include converting raw application data to raster data or to a display list. However, other types of processing are also contemplated.

A stream of the raw application data is transmitted to a job inspector 20 in a step 114. An initial scan of the job is performed by the job inspector 20 in a step 116. The initial scan identifies constant data (i.e., master data) representing objects common to more than one (1) of the pages, for example, within the raw application data of the image. During the initial scan, the location and size of the objects within the raw application data are determined and stored in the job inspector 20.

A determination is made, in a step 120, whether the raw application data for the job includes constant data. If the raw application data includes constant data, the various constant objects within the image are identified in a step 122; otherwise, control passes to a step 172 for stopping the process. Then, in a step 124, copies of the raw data representing the respective constant objects are transmitted to a cache manager 22 via a data line 24. Control signals for controlling the cache manager 22 are transmitted from the job inspector along a control line 25. Each occurrence of the constant data within the raw application data is replaced, in a step 126, by an identifier of the respective object. The identifiers point to locations within the cache manager 22 of the raw application data associated with the respective object. The raw application data corresponding to the variable objects in the image, along with the identifiers of the constant objects, are transmitted, in a step 130, to the storage device 12.

In a step 132, a first one of the constant objects in the cache manager 22 is identified as a current object. A determination is made, in a step 134, whether the current object should be stored in a print-ready cache 26. The criteria used for determining whether to cache the current object is discussed in more detail below. If it is determined that the current object is to be cached, a determination is made in a step 136 whether the current object should be converted to raster data (i.e., raster image processed (RIPed)). If the current object should not be RIPed, control passes to a step 150, which will be discussed in more detail below. Otherwise, if the current object should not be cached, control passes to a step 137 for identifying the next object to be processed; then control returns to the step 132 for setting the next object to be processed as the current object. Optionally, if it is anticipated that the current object will be used across different jobs, data for the current object is stored in a persistent storage 30.

If it is determined in the step 136 that the current object is to be RIPed, the raw data for the current object is transmitted, in a step 140, to a raster image processor (RIP) 32 (via a data line 34) and, at the same time, to the cache 26 (via a data line 36). Then, in a step 142, the raw data associated with the current object is RIPed in the raster image processor 32. Optionally, comments included in the raw data cause the object to be scaled as the object is RIPed. The RIPed data is transmitted, in a step 144, from the RIP 32 to the print-ready cache 26 (via a data line 40). Optionally, the RIPed data is transmitted back to the cache manager 22 via the data line 34. The cache manager, the operations of which will be discussed in more detail below, controls where the RIP 32 transmits the data via a control line 42.

A determination is made, in a step 146, whether the size of the RIPed data associated with the current object is greater than the size of the corresponding raw data. If it is determined that the size of the RIPed data is greater than the size of the corresponding raw data, control passes to a step 150 for transmitting a copy of the raw data associated with the current object to the print-ready cache 26. Therefore, the print-ready cache 26 includes copies of both the RIPed and raw data associated with the current object. Control then passes to a step 152. Having copies of both the RIPed and raw data for an object in the print-ready cache 26 is advantageous if, for example, the cache 26 becomes full and the cache manager 22 determines it is desirable to store data for another object in the cache 26. In that case, the RIPed data for the current object may be deleted from the cache 26 while the raw data is retained. Consequently, if the rasterized data for the current object is needed again in the future, the raw data is readily available to be RIPed.

Otherwise, if it is determined in the step 146 that the size of the RIPed data associated with the current object is less than or equal to the size of the corresponding raw data, control passes directly to the step 152. In this case, only a copy of the RIPed data for the current object is stored in the print-ready cache 26.

In the preferred embodiment, the data for the current object is stored in the cache 26 according to a hashing strategy. More specifically, the object is identified by a unique identifier that maps directly to the object. If the object to be cached is, for example, a font, the full font name and transformation form a hashing key.

In the step 152, a determination is made whether additional objects remain for the cache manager 22 to process. If more objects do remain to be processed, control passes to a step 154 for setting a next one of the objects as the current object. Then, control returns to the step 134 for determining if the current object should be cached. Otherwise, if no more objects remain for the cache manager 22 to process, control passes to a step 156 for RIPing and assembling the image data.

In the step 156, a first segment of the data stored in the device 12 is set as the current segment. Then, in a step 160, the current segment of raw data is transmitted from the storage device 12 to a RIP and assembly component E as a function of a command sent to the component E from the cache manager 22 via a control line 46. The component E combines data in the job stream with data in the cache 26 to build complete pages of the image. The raw data of the current segment is RIPed and assembled by the component E in a step 162. The assembly portion of the step 162 replaces identifiers of objects appearing on more than one (1) of the pages of the image with the corresponding data in the cache 26. The hashing function described above is used for identifying the locations of the data. If the raster (RIPed) data for the identifier in the current segment is available in the cache 26, the identifier is replaced by the corresponding raster data. If only the raw data corresponding to the identifier is available in the cache 26, the corresponding raw data is transmitted to the RIP and assembly component 44; then, the RIP in the component 44 rasterizes the raw data. If, on the other hand, neither the raw data nor the RIPed data corresponding to the identifier is stored in the cache 26, a corresponding control signal is passed from the component 44 to the cache manager 22 via the control line 46. Then, the cache manager 22 retrieves the corresponding raw data from the job stream (via the job inspector 20) and passes the requested raw data to the component 44 via the cache 26.

In the preferred embodiment, the RIP 32 and the RIP and assembly component 44 simultaneously process image data. Furthermore, data is simultaneously scanned by the job inspector 20, received by the cache manager 22, and transmitted to the cache 26. In this manner, parallel processing is achieved.

The RIPed and assembled current segment is transmitted to the second output device 16 in step 164. It is to be understood that the output device 16 transmits the current segment to an output medium (e.g., paper). Optionally, the current segment is also transmitted to the first output device 14, for example, to be viewed on a monitor. A determination is made, in a step 166, whether more segments of the image remain to be processed by the component 44. If more segments remain, control passes to a step 170 for incrementing the next segment to be the current segment; control then returns to the step 160 for transmitting the current segment from the storage device 12 to the component 44. Otherwise, if no more segments remain to be processed, control passes to a step 172 for stopping the process.

As discussed above, the cache manager 22 controls what data is stored in the cache 26 according to a caching strategy. With reference to FIGS. 1–4, the preferred caching strategy begins in a step 200. A determination is made, in a step 210, whether the print-ready cache 26 is full.

If the cache 26 is full, the cache manager 22 determines, in a step 212, the object data stored in the cache 26 that will be used in the most-distant future; otherwise, control passes to a step 230 for stopping the process. More specifically, the cache manager 22 communicates with the job inspector 20 via the control line 25, to determine which object stored in the cache 26 will be used last (i.e., in the most-distant future) by the RIP and assembly component 44 when processing the image. Once the object to be used in the most-distant future is identified, a determination is made, in a step 214, whether both raw and RIPed data for the object identified in the step 212 is stored in the cache 26.

If both raw and RIPed data for the object identified in the step 212 are not stored in the cache 26, a determination is made, in a step 216, whether both raw and RIPed data for another object, which is to be used by the component 44 after a predetermined time, is stored in the cache 26. If another object is identified in the step 216, that object is selected, in a step 220, as the object to be deleted; otherwise, the object identified in the step 212 is selected, in a step 222, as the object to be deleted. Then, in a step 224, the RIPed data for the selected object is deleted.

If both raw and RIPed data for the object identified in the step 212 are stored in the cache 26, control passes to the step 222 for selecting that object to be deleted. Then, control passes to the step 224 for deleting the RIPed data for the selected object.

A determination is made in a step 226 whether enough room has been made available to store the current object in the cache 26. If enough room is available, control passes to a step 230 for stopping the process; otherwise, control returns to the step 212 for identifying the object in the cache 26 that will be used in the most distant future. Deleting an object from the cache when it is the one to be needed most distantly in the future is called herein a most distantly needed caching strategy.

Figure 5:
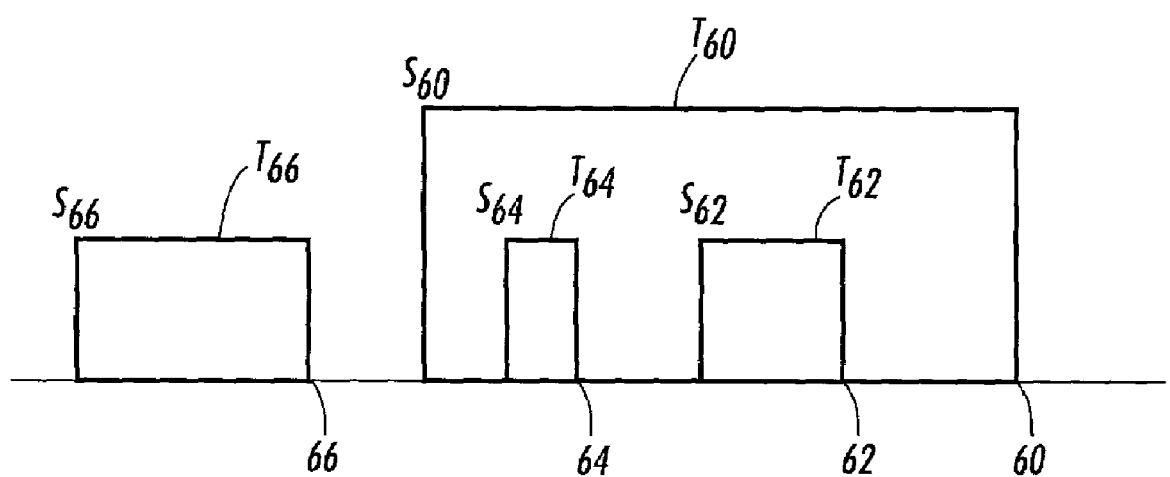
FIG. 5 illustrates a timing diagram for an alternative caching strategy.

An alternative caching strategy is illustrated with respect to FIG. 5. In this embodiment, a plurality (e.g., four (4)) of the objects 60, 62, 64, 66 used in the most distant future are identified. Of the objects 60, 62, 64, 66, the object 60 is required last (i.e., in the most distant future) while the object 66 is required first (i.e., in the least distant future). The start times $S_{60}$, $S_{62}$, $S_{64}$, $S_{66}$ indicate the times necessary to start rasterizing the objects 60, 62, 64, 66, respectively, to ensure the objects 60, 62, 64, 66 are available when needed.

Consequently, $T_{60}, T_{62}, T_{64}, T_{66}$ indicate the times necessary for rasterizing the objects 60, 62, 64, 66, respectively. For purposes of explanation, the times for rasterizing the objects 62, 64 are assumed to be less than a predetermined threshold while the times for rasterizing the objects 60, 66 are greater than or equal to the predetermined threshold. Therefore, if the cache 26 is full, the cache manager 22 first deletes the object 60 and then determines if more room is needed in the cache to store the current object. If more room is necessary, the cache manager 22 then deletes the object 66. If still more room is necessary in the cache 26, the cache manager 22 identifies remaining objects stored in the cache 26, which will be needed in the most-distant future, that can be rasterized within the predetermined threshold of time. Those remaining objects are selectively deleted until enough room is available in the cache 26 to accommodate the current object.

The preferred embodiment has been described as caching constant objects identified during an initial scan of the job. Optionally, variable raw application data is also identified and cached (pre-rasterized) during the initial scan. In this case, a control signal is transmitted between the cache manager 22 and the RIP and assembly component E for caching objects such as complex graphics that may only be used on a single page in the image. The strategy for caching such a variable data object is the same as discussed above.

The preferred embodiment has been described as replacing objects in the cache, when full, by identifying objects that are needed in the most distance future and removing them from the cache to make room for new objects. At least two alternate strategies are also contemplated in the cache full case. The first is based on frequency of usage of the object. In this case a particular object in the cache may be used in the most distant future, and would normally be a candidate for removal, but a high frequency of usage in the future would warrant keeping this object over another one in the cache with lower frequency of usage. The second alternate strategy is evaluating processing cost to reprocess the raw data to raster or print-ready format. Objects that cost more, in terms of processing cost, to recreate in raster or print-ready format remain in the cache over lower processing cost objects. In some cases, if the raw object requires very low processing cost, the raw object may always be processed when needed from the job stream vs. maintaining a pre-processed cached version. Estimates of processing cost are obtained by several methods, one of which is saving the processing cost with each raw data object once the object has been processed. In addition, the preferred embodiment can use a weighted combination of these three strategies to decide on objects that should be removed from a full cache.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof

Having thus described the preferred embodiment, the invention is now claimed to be:

1. A method for processing raw application data including a plurality of occurrences of an object, the method comprising:
   receiving a stream of the raw application data, including object raw data, which represents the object, and other raw data, into a job inspector;
   scanning the stream of the raw application data within the job inspector for identifying each of the occurrences of the object;
   transmitting the object raw data to a cache manager; and
   caching data representing the object raw data as a function of the object occurrences detected by the job inspector.

2. The method for processing raw application data as set forth in claim 1, further including:
   converting the object raw data into object raster data;
   replacing each of the occurrences of the object raw data in the raw application data with an identifier associated with the object raster data; and
   converting the raw application data into raster data, the identifiers within the raw application data being replaced with the object raster data.

3. The method for processing raw application data as set forth in claim 2, wherein the transmitting and caching steps include:
   identifying a location within the cache corresponding to the object raster data according to a hashing function.

4. The method for processing raw application data as set forth in claim 3, wherein the caching step further includes:
   if a size of the object raster data is greater than a size of the object raw data, transmitting both the object raster data and the object raw data into the cache.

5. The method for processing raw application data as set forth in claim 3, further including:
   performing the steps of receiving, scanning, transmitting, and caching in parallel.

6. The method for processing raw application data as set forth in claim 1, wherein the caching step includes:
   converting the object raw data into object raster data; and
   transmitting the object raster data into a cache.

7. The method for processing raw application data as set forth in claim 1, wherein the caching step includes:
   identifying objects used in the most distant future.

8. The method for processing raw application data as set forth in claim 1, wherein the caching step includes:
   determining a frequency of usage of the object.

9. The method for processing raw application data as set forth in claim 1, wherein the caching step includes:
   evaluating a processing cost of the object.

10. The method for processing raw application data as set forth in claim 1, wherein the caching step includes at least two of:
    identifying objects used in the most distant future;
    determining a frequency of usage of the object; and
    evaluating a processing cost of the object.

11. A system for processing raw application data including a plurality of occurrences of an object, comprising:
    a job inspector which receives a stream of the raw application data, including object raw data which represents the object, and other raw data, the job inspector scanning the stream of the raw application data for identifying each of the occurrences of the object;
    a cache manager, which receives the object raw data from the job inspector; and
    a cache for storing data representing the object raw data as a function of the object occurrences detected by the job inspector.

12. The system for processing raw application data as set forth in claim 11, wherein the job inspector replaces each of the occurrences of the object raw data in the raw application data with an identifier associated with the object raster data, the system further including:
    a raster image processing device for converting the raw application data into raster application data and, therefore, converting the object raw data into object raster data; and
    an assembly component which replaces the identifiers within the raster application data with the object raster data as the raster image processing device converts the raw application data into the raster application data.

13. The system for processing raw application data as set forth in claim 11, wherein:
the cache manager sends a control signal to a raster image processing device for causing the raster image processing device to convert the object raw data into object raster data; and
the cache manager transmits the object raster data into the cache.

14. The system for processing raw application data as set forth in claim 12, wherein:
the assembly component retrieves the object raster data from the cache when replacing the identifiers; and
the cache manager identifies a location within the cache corresponding to the object raster data according to a hashing function.

15. The system for processing raw application data as set forth in claim 14, wherein if a size of the object raster data is greater than a size of the object raw data, the cache manager transmits both the object raster data and the object raw data into the cache.

16. The system for processing raw application data as set forth in claim 14, wherein the job inspector, the cache manager, the cache, and the assembly component operate in parallel.

17. The system for processing raw application data as set forth in claim 11, wherein the cache manager deletes data in the cache according to a most distantly needed caching strategy.

18. A method for printing original data including variable and constant objects, the method comprising:
identifying the constant objects within the original data;
transmitting the original data associated with the variable objects to a storage device;
transmitting the original data associated with the constant objects to a cache manager;
for each of the constant objects:
if a cache is full, deleting previously cached data according to a most distantly needed caching strategy;
if the cache is not full, storing data representing the constant object into the cache; and
assembling final raster data from the variable objects in the storage device and the constant objects in the cache.

19. The method for printing data including variable and constant objects as set forth in claim 18, further including:
replacing the constant objects in the original data with identifiers; and
storing the identifiers in the storage device.

20. The method for printing data including variable and constant objects as set forth in claim 19, wherein the assembling step includes:
substituting the data representing the constant object, which is stored in the cache, for the identifiers.

21. The method for printing data including variable and constant objects as set forth in claim 18, further including:
transmitting the final raster data to an output device.

* * * * *